Patented Feb. 13, 1945

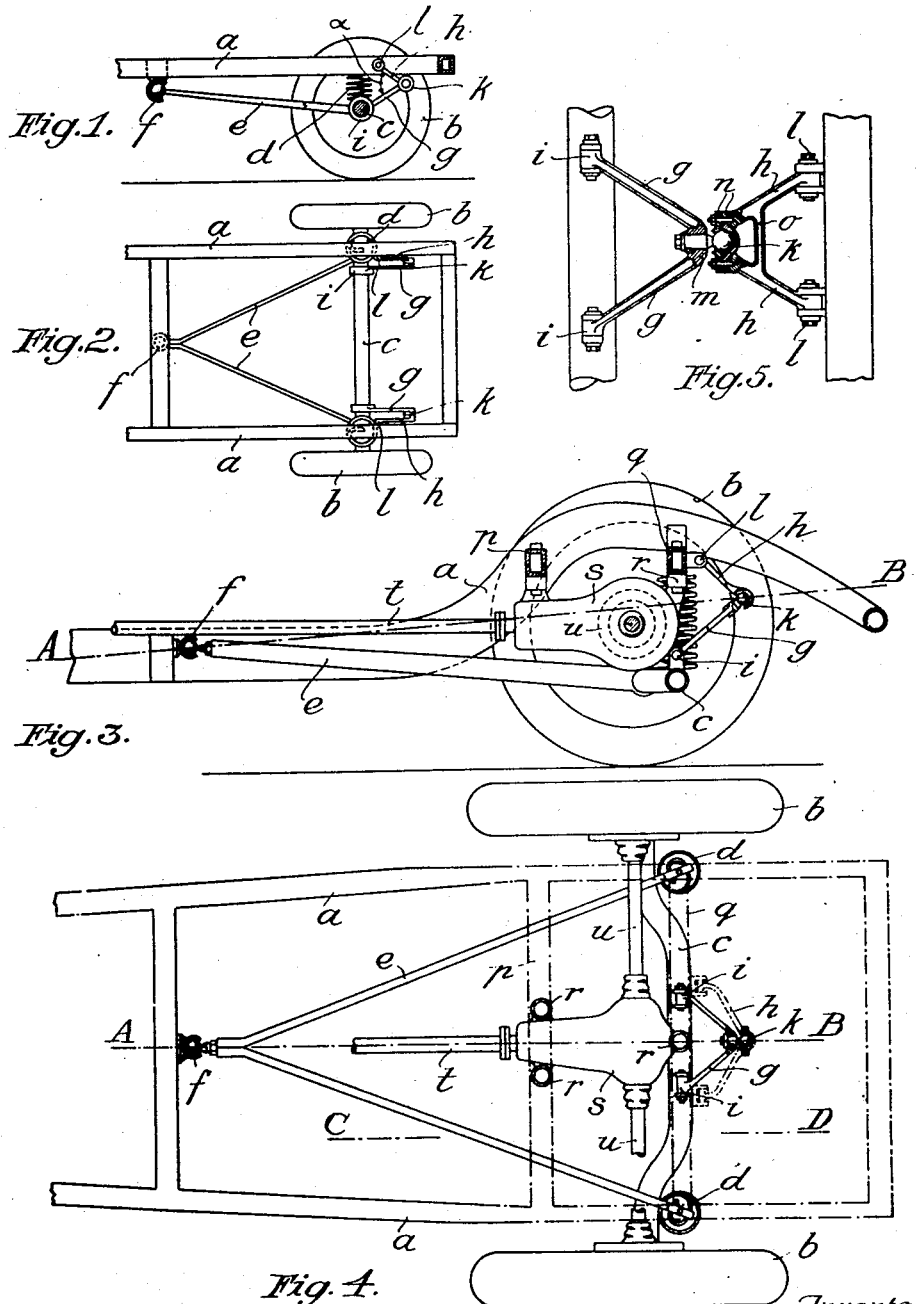

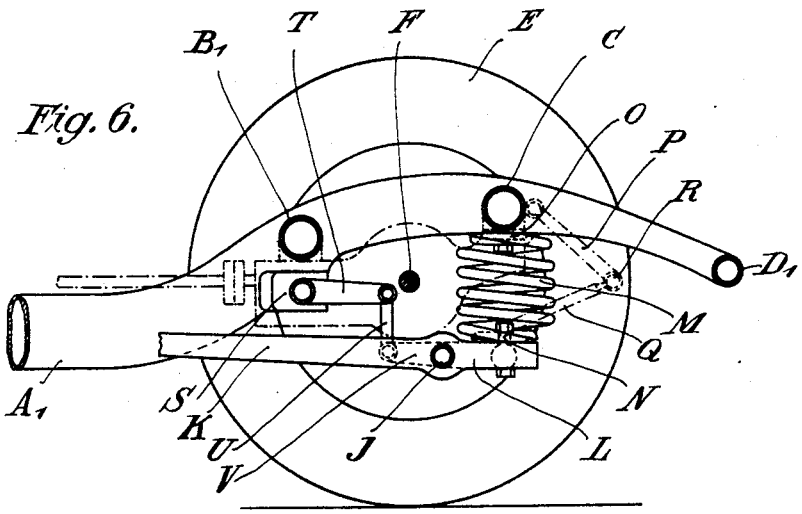
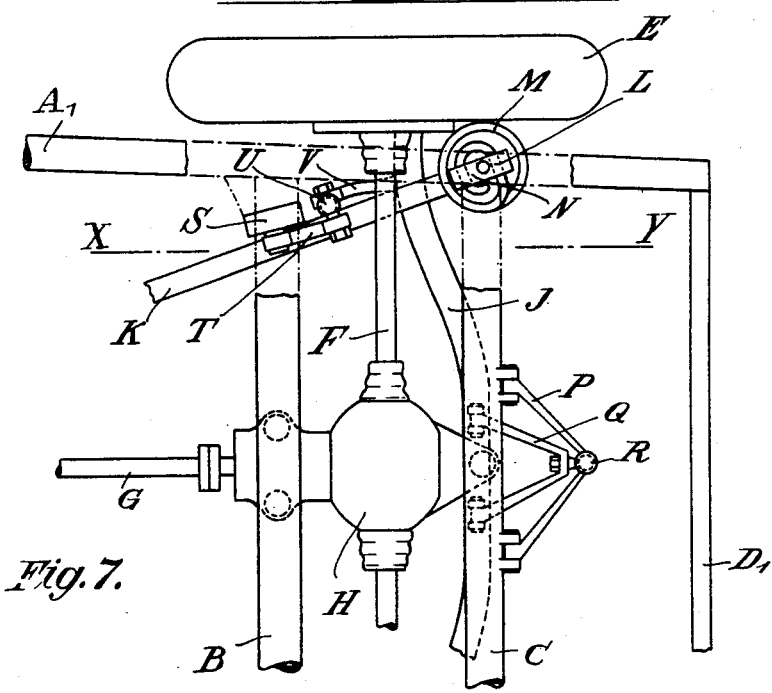

2,369,501

UNITED STATES PATENT OFFICE 2,369,501

AXLE GUIDING ARRANGEMENT

Max Wagner and Walter Laukhuff, Stuttgart, Germany; vested in the Alien Property Custodian Application December 6, 1938, Serial No. 244,160
In Germany September 17, 1937

15 Claims. (Cl. 180—75)

This invention relates to an axle guiding arrangement for rigid axles supported by springs which are freely yieldable under transverse forces. Such springs are—in contradistinction to leaf type springs—e. g. so-called ring springs (consisting of separate spring rings telescopically fitted one in the other), rubber pads, hydraulic and pneumatic cushions or the like, preferably helical springs and more especially unguided helical springs. This because helical springs show—apart from the drawback which is overcome by the invention—special advantages. The invention is specially adapted for motor vehicles and has for its object to effect a kinetically perfect guiding of such axles which are suitable of reliably taking up even large forces acting between the axle and chassis and which are not absorbed by the springs and to ensure a good road-holding.

The invention consists substantially in that one or more vehicle axles are guided against lateral deflection relatively to the frame by one or several pairs of toggle lever-like links arranged in series. Preferably the rear axle is guided according to the invention and the front axle is constructed as independent parallel guiding of the wheels. Shearing forces and twisting moments (especially driving and braking moments) of at least one axle are preferably taken up by a torsion bracing, provision being made that the vehicle axle can swing about a longitudinal axis extending in the direction of travel. For this purpose at least one of the three joints by which each pair of the toggle lever-like, series arranged guide links is connected together and to the chassis or to the vehicle axle is constructed as a joint movable in all directions, preferably the joint connecting the two guide links, for example as a ball joint, whereas the other joints preferably hinge joints only allow a swinging movement about a transverse axis. Preferably only a single pair of links is provided for guiding the vehicle axle, the joint movable in all directions being arranged in the central longitudinal plane of the vehicle.

Contrary to the spring suspension with blade springs (leaf type springs) the axle is guided and resiliently cushioned according to the invention in such a manner that the springs exclusively serve for the cushioning of the axle in vertical direction and are completely relieved from lateral forces, whereas the guiding of the axle and absorption of the lateral forces are effected exclusively by the hingedly interconnected links. This results in a free working of the axle relatively to the chassis and in an advantageous, adaptable spring suspension which can be easily constructed in such a manner that it immediately responds without any friction even in the case of small shocks and obstacles.

The advantages of this spring suspension can be further improved if with driven axles the axle gear is arranged on the chassis with the result that the masses to be cushioned are reduced and the cushioning is made still softer and more adaptable.

Another advantage of the invention is, that the ball joint allowing the swinging movement of the axle is located between the two links. On this account the lateral forces acting on the axle, which are transmitted by the ball joint, cause smaller stresses in the hinge joints of the links, because the arm of lever with which these lateral forces subject the links and bearing points of the links to bending and pressure stresses, corresponds at the most to the length of one link.

By the forked construction of the links they can also be mounted in an advantageous manner on the chassis and on the axle respectively at both sides of an axle gear mounted on the chassis (e. g. by an extension on the gear) in that their forked arms straddle the axle gear and its fixation eye so that the space required by the links is reduced to a minimum. This advantage is particularly desirable when the hinge points of the two links are located approximately one above the other on the chassis and on the axle, whereas the joint connecting the links, (preferably an universal joint), is located towards the end of the vehicle, so that the two links, seen from the side, form a rearwardly directed V.

Moreover the invention relates to a practical arrangement and construction of the axle guide formed by the guide links or the torsion bracing.

In the case of a chassis composed of longitudinal and transverse girders and if helical springs are used, a preferred form of embodiment of the invention consists in that each helical spring bears from below against a longitudinal girder of the chassis at its junction with a transverse girder or near this point and the corresponding shock absorber is arranged on a longitudinal girder of the chassis at its junction with another transverse girder of the chassis or near this junction. Preferably the two mentioned transverse girders are on different sides of the axle.

Helical springs and shock absorbers are preferably arranged on opposite sides of the wheel axle, for example of a swing semi-axle or of a rigid axle, the helical spring preferably bearing with its lower end against the torsion stay extended beyond the extension of its axle to approximately the point of intersection of the longitudinal girder with the transverse girder.

The invention possesses the advantage of a particularly favourable absorption of the forces, as both the spring forces and also the shock absorber forces are transmitted to such points of the longitudinal girder of the chassis which, owing to the bracing by the transverse girders are particularly suitable for this purpose. The chassis is thus subjected to torsional and bending stresses to a minimum extent.

Furthermore the invention results in a particularly great space-saving arrangement, as the spring and shock absorber fit under the chassis girders and both ends of the axle in a particularly advantageous manner.

Only a single helical spring of particularly large diameter is preferably provided for each side of the vehicle. Thus the structural arrangement is yet more favourable and at the same time a particularly elastic and gentle spring suspension is attained.

A hydraulic shock absorber is preferably used which during the upward movement of the axle exerts no or very little damping effect but during the downward movement and also possibly in the case of relatively large deflections exerts an intensified damping effect.

In the accompanying drawings,

Figs. 1 and 2 show diagrammatic views of a form of construction of the axle guide according to the invention in vertical section and plan view respectively, one pair of guide links being provided on each side of the vehicle, Figs. 3 and 4 show also in vertical section and plan view respectively and in greater constructional detail another form of construction according to the invention in which only a single middle pair of guide links is provided, while Fig. 4A is a sectional view of a detail of Fig. 4, and finally Fig. 5 is an illustration on a large scale of both guide links which for the sake of clarity are shown in the same plane.

Fig. 6 shows the rear part of a vehicle chassis composed of longitudinal and transverse girders with the special arrangement of the helical springs and of the shock absorbers in side elevation partly in section on line X—Y of Fig. 7, Fig. 7 is a top plan view of Fig. 6 in which portions of the chassis are cut away for the sake of clearness.

In Figs. 1 and 2 $a$ designates the chassis, $b$ the rear wheels, $c$ the rear axle which is spring supported relatively to the frame by, for example, unguided spiral springs $d$. The axle is supported against shearing forces acting in the direction of travel and against twisting moments, especially driving and braking moments, in known manner by a triangular bracing forced by two stays $e$, which bracing is hingedly connected to the chassis—preferably by a ball joint $f$—and forms with the axle $c$ a rigid triangular system.

As the springs $d$ cannot take up lateral forces, two pairs of links each comprising two toggle lever-like, series arranged links $g$ and $h$ are provided for guiding the axle against lateral displacement, the link $g$ being connected by a joint $i$ to the axle $c$ and by a joint $k$ to the other link $h$ which in turn is connected to the chassis by a joint $l$. The two links form an angle $\alpha$ which when the axle is in its normal position is less than 90° and which becomes smaller when the axle swings upwards and larger (for example more than 90°) when it swings downwards.

If the joints $i$, $k$, $l$ are constructed as hinge joints in such a manner that they allow a swinging movement of the hingedly connected parts only about a transverse axis of the vehicle, the vehicle axis $c$—provided the links $g$ and $h$ are sufficiently rigid—cannot swing about a longitudinal axis extending in the direction of travel. By employing rotary elastic links $g$, $h$ such a swinging movement of the axis relatively to the frame can however be attained to a greater or lesser extent. It can also be assisted by constructing one of the joints $i$, $k$, $l$ as a ball joint or in some other way as a joint movable in several or all directions, for example by interposing rubber.

The form of construction illustrated in Figs. 3 to 5 is particularly practical and particularly suitable for heavy stressing. The corresponding parts are designated as in Figs. 1 and 2. Contrary to the form of construction according to Figs. 1 and 2 only a single middle pair of links $g$, $h$ is provided, the upper link $h$ and the rear part of the chassis being indicated in dot-dash lines in Fig. 4. The links are triangular—or forked or V-shaped as shown particularly in Fig. 5, the link $g$ being connected to the axle by two pin or hinge joints $i$ arranged on the ends of the fork arms, and the link $h$ to the chassis by correspondingly arranged pin or hinge joints $l$. The two links are connected by a ball joint $k$ arranged in the longitudinal central plane of the vehicle. The ball $k$ is arranged on a pin $m$ inserted on to the link $g$ and secured by a nut, whereas the ball cup is bolted in the form of a two-part bearing $n$ on one end of the link $h$ provided with a cross brace $o$. The joints $i$—$i$—$k$ and $l$—$l$—$k$ each form a rigid triangle with the result that the axle $c$ is secured in a reliable manner against lateral displacement relatively to the chassis and even large forces can be transmitted perfectly. Yet, for example rubber pads might be interposed in the joints to effect a noise damping and a certain elastic taking up of lateral shocks.

Owing to the ball joints $f$ and $k$ arranged in the longitudinal central plane of the vehicle the vehicle axle can swing relatively to the chassis about the longitudinal axis A—B so that even one-sided stresses by which one or other wheel is lifted are gently damped. Instead of the joint $k$, the joint $i$ or $l$ may be constructed as ball joint or as joint movable in several or all directions and allowing the vehicle axle to swing about a longitudinal axis. If the joint $l$ is correspondingly constructed the advantage is derived that the longitudinal axis A—B which would now extend through the joint $l$ is correspondingly higher and above the middle of the wheels and consequently the stability of the vehicle in respect to transverse oscillations and transverse inclinations is increased to a corresponding extent.

The axle $c$ is constructed as a tubular axle and rearwardly bent in the middle in order to pass around the differential gear $s$ suspended for example elastically at three points $r$ on the cross members $p$ and $q$ of the chassis. The stays $e$ may also be tubular or box-shaped. As can be seen they extend beyond the axle $c$, the axle $c$ passing through and welded to them to form a rigid unit. The ends of the stays projecting beyond the axle serve as lower support for the unguided helical springs $d$ which are secured to the end of the stays or to the chassis by fastening elements.

The vehicle is driven by an engine, for example arranged at the front of the vehicle, through the intermediary of the driving shaft t, the differential gear s and the Cardan shafts u. The front wheels (not shown) are preferably guided parallel or substantially parallel independent the one of the other, for which links, transverse springs, cylindrical guides or other guiding means may be used.

Figs. 6 and 7:

The chassis comprises longitudinal girders $A_1$ preferably of oval cross-section and preferably tubular transverse girders B, C and $D_1$.

The rear wheels E are driven by Cardan shafts F which in turn obtain their drive from the Cardan shaft G through the axle gear H which is secured on at least one of the transverse girders or for example at two points on the transverse girder B and at one point on the transverse girder C.

The rear wheels E are connected by a rigid axle J which is tubular and bent rearwardly around the axle gear, preferably towards the side of said girder, one of the links of the frame of links being hingedly mounted on this girder.

For taking up the shearing forces tubular or box-shaped torsion stays K are provided which, in the example illustrated, are rigidly connected to the axle in that they are led therethrough and welded thereto. The stays K, only one of which is shown in the drawings, form with the axle J for example a triangular bracing which at its front end can be supported on the chassis in known manner by a ball joint. A helical spring M bears downwards on the end L of the stay K projecting beyond the axle I, the lowermost coil of the helical spring wound to a smaller diameter being clamped in known manner by a fastener element N. The uppermost coil of the helical spring is similarly connected by a fastener element O to the longitudinal girder $A_1$ below its junction with the transverse girder C.

For taking up the lateral forces between the axle and chassis, which cannot be taken up by the helical spring, again a toggle-lever-like link guiding arrangement consisting of forked links P and Q is provided, the link P being connected to the transverse girder C and the link Q to the axle J by hinge joints and the two links P and Q being connected one to the other by means of a ball joint R.

The shock absorption is effected by a hydraulic shock absorber S which is fixed on the inner side of the longitudinal girder $A_1$ directly underneath the transverse girder B and whose lever T is connected to an arm V of the axle J by means of a link U provided with ball joints.

As can be seen the helical spring M is arranged under the point of intersection of the longitudinal girder $A_1$ with the transverse girder C and the shock absorber S approximately at the point of intersection of the longitudinal girder $A_1$ with the transverse girder B in such a manner that the helical spring and shock absorber are on opposite sides of the axle J or the Cardan shaft F. The helical spring M is of particularly large diameter so that a soft elastic suspension is obtained, and is arranged on the extension L of the stay K in such a manner that it is behind the arcuate bend of the axle J.

As may be seen a preferred form of embodiment consists in that the thrust stays supporting the axle against the chassis in the direction of the travel and the axle are constructed as hollow elements and rigidly connected at the points of intersection so that a triangular thrust bracing of hollow elements is formed.

The stays then may be of box-shaped cross-section and the axle is tubular and extends through the thrust stays and is welded thereto.

Furthermore the thrust stays are extended beyond the axle and the extensions serve for supporting the helical springs resiliently supporting the axle against the frame.

Finally according to a preferred form of embodiment the arrangement comprises a rigid axle, means for supporting the axle relatively to the frame transversely to the direction of travel of the vehicle, thrust stays for supporting the axle in the direction of travel, helical springs for supporting the axle relatively to the chassis in substantially vertical direction, the springs bearing directly against the thrust stays.

In this case, if the chassis consists of longitudinal and transverse girders the thrust stays may extend beyond the axle and the helical springs are arranged between the axle and the chassis in such a manner that the lower end of each of the springs bears against one of the extensions of the thrust stays and the upper end of each of these springs bears against the longitudinal girder of the chassis at its junction with the transverse girder of the chassis.

Having now particularly described and ascertained the nature of our said invention and in what manner the same is to be performed, we declare that what we claim is:

1. Axle suspension comprising a chassis, a pair of wheels, an axle connecting the wheels, an axle driving gear arranged on the chassis independently of the axle with articulated driving means for driving the wheels from the axle driving gear, thrust brace members connected to the axle so as to form with the latter a substantially triangular thrust brace supporting the axle against the chassis in a substantially longitudinal direction of the vehicle, means providing for articulated connection of the thrust brace to the chassis and allowing for mobility between the thrust brace and the chassis at least about a transverse and a longitudinal axis of the vehicle, two links connected in series for supporting the axle relatively to the chassis transversely thereto and to the driving direction, articulating means providing for articulated connection of one link to the chassis, articulating means providing for articulated connection of the other link to the axle, articulating means providing for articulated connection of the two links to each other so as to cause the chassis, the thrust brace and the two mentioned links to present in side elevation, a link quadrilateral, one of the three last named articulating means allowing for mobility between the parts connected by them at least about a longitudinal and a transverse axis of the vehicle, while the two other means substantially allow for mobility only about a transverse axis of the vehicle so that the axle besides executing an up-and-down movement may also execute a swinging movement in relation to the chassis about a longitudinal axis, which is determined by the articulated connection of the thrust brace to the chassis on the one hand and by the last named articulated connection allowing for mobility about a longitudinal and transverse axis, and elastic means comprising guideless helical springs having their central axes disposed in substantially upright positions for cushioning the up-and-down movement of the axle in relation to the chassis, and the axle penetrating the thrust brace members connected thereto.

2. Axle suspension comprising a chassis, a pair of wheels, an axle connecting the wheels, an axle driving gear arranged on the chassis independently of the axle with articulated driving means for driving the wheels from the axle driving gear, thrust brace members connected to the axle so as to form with the latter a substantially triangular thrust brace supporting the axle against the chassis in a substantially longitudinal direction of the vehicle, means provided for articulated connection of the thrust brace to the chassis and allowing for mobility between the thrust brace and the chassis at least about a transverse and a longitudinal axis of the vehicle, two links connected in series for supporting the axle relatively to the chassis transversely thereto and to the driving direction, so as to cause the chassis, the thrust brace and the two mentioned links to present in side elevation, a links quadrilateral, means providing for articulated connection of one link to the chassis, means providing for articulated connection of the other link to the axle, said means being so constructed as to allow of mobility only about a transverse axis of the vehicle, means providing for articulated connection of the two links to each other so as allow of mobility between the two links about a longitudinal and a transverse axis of the vehicle so that the axle besides executing an up-and-down movement may also execute a swinging movement in relation to the chassis about a longitudinal axis, which is determined by the articulated connection of the thrust bracing to the chassis on the one hand and by the last named articulated connection allowing for mobility about a longitudinal and transverse axis, and elastic means for cushioning the up-and-down movement of the axle in relation to the chassis.

3. Axle suspension in the combination according to claim 2, in which the means providing for articulated connection between the thrust brace and the chassis on the one hand and the two links connected in series on the other hand are designed as ball and socket joints.

4. Axle suspension as in claim 2, in which the two links mentioned are so arranged substantially above each other as to form a V with the apex thereof directed to the rear, while the legs formed by the links are articulated to each other by the means movable about a longitudinal and a transverse axis.

5. Axle suspension comprising a pair of wheels, a frame consisting of longitudinal frame members and transverse frame members, an axle drive secured to the transverse members, means for driving the wheels by means of the axle drive, an axle connecting the wheel and bent around the axle drive, two thrust braces connected with the axle and arranged to form a triangle with the axle, extended beyond the axle up to the vertical plane of the longitudinal members, means providing for articulated connection of the thrust bracing with the frame at the converging ends of the thrust braces, helical springs for supporting the axle against the frame, which are exclusively arranged in a substantially vertical direction between the extended ends of the thrust braces and the longitudinal members of the frame.

6. Axle suspension according to claim 5, having shock absorbers arranged on the side of the axle opposite the helical springs in the angle between the longitudinal members of the frame and the thrust braces.

7. Axle suspension for a chassis, there being a pair of wheels and an axle drive secured to the chassis, means for driving the wheels by means of the axle drive, a housing for said axle drive, an axle bent around the axle drive housing, means for transmitting the longitudinal forces developed from the axle to the chassis, means for transmitting the transverse forces from the axle to the chassis, consisting of two fork-shaped links connected in series, means providing for articulated connection of the fork ends of one link to the chassis and of the other link to the axle, and means providing for articulated connection of the other ends of the two links to each other so that the ends of the forks of the links are linked to the frame and the axle drive housing on both sides of the axle housing, and elastic means for cushioning arranged between axle and chassis.

8. Axle suspension according to claim 7, wherein the chassis consists of a frame with longitudinal and transverse members and the axle drive housing is secured at least partly to one of the transverse members, one of the two links being articulated by means of its fork ends to the same transverse member at both sides of the axle drive housing.

9. Axle suspension according to claim 7, wherein the two links are arranged in the shape of a V with the points thereof directed rearwards.

10. Axle suspension for vehicles comprising a vehicle frame consisting of longitudinal members and cross members, a pair of wheels, an axle connecting the wheels, means disposed between the axle and the frame of said vehicle which allows the axle to execute in relation to said frame not only an upward and downward movement, but at the same time also a swinging movement about a longitudinal axis of the vehicle, two thrust braces which are each rigidly connected to the axle and to one another so as to form together with said axle a substantially triangular and rigid bracing unit substantially solely supporting the axle against the frame in the longitudinal direction of said vehicle, the thrust braces being extended beyond the axle, substantially vertically arranged springs bearing on the one hand against the frame and on the other hand against the extension of the thrust braces, axle gear associated with said vehicle, shock absorbers arranged on the frame, and connecting rods disposed between the axle and the shock absorbers, each shock absorber being arranged on the side opposite one of the springs in the angle between one of the longitudinal frame members and a thrust brace, the axle gear being suspended from the frame independently of the axle and the axle being bent or arched around said axle gear and also penetrating the thrust braces connected thereto.

11. Axle suspension for a vehicle, including a chassis, a pair of wheels, an axle connecting the wheels, an axle driving gear arranged on the chassis independently of the axle with articulated driving means for driving the wheels from the axle driving gear, thrust brace members comprising two struts connected to the axle so as to form with the latter a substantially triangular thrust brace supporting the axle against the chassis in a substantially longitudinal direction of the vehicle, said two struts having extensions projecting beyond the axle, means providing for articulated connection of the thrust brace to the chassis and allowing for mobility between said thrust brace and the chassis at least about a transverse and a longitudinal axis of said vehicle, two links connected in series for supporting the axle relatively to the chassis transversely thereto and to the driving direction, articulating means providing for articulated connection of one of said two links to the chassis, additional articulating means providing for articulated connection of the other link to the axle, further articulating means providing for articulated connection of the two links to each other so as to cause the chassis together with the thrust brace and the two mentioned links to present a link quadrilateral in side elevation, one of the three last named articulating means allowing for mobility between the parts connected by all three means at least about a longitudinal and a transverse axis of the vehicle while the two other articulating means substantially allow for mobility only about a transverse axis of the vehicle so that the axle besides executing an up-and-down movement may also execute a swinging movement in relation to the chassis about a longitudinal axis which is determined by the articulated connection of the thrust brace to the chassis on the one hand and by the last named articulating means allowing for mobility about a longitudinal and transverse axis, and resilient means comprising helical springs which bear against the extensions of the struts of the thrust brace for cushioning the up-and-down movement of the axle in relation to the chassis, and the axle penetrating the thrust brace members connected thereto.

12. Axle suspension for a vehicle, including a chassis, a pair of wheels, an axle connecting the wheels, an axle driving gear arranged on the chassis independently of the axle with articulated driving means for driving the wheels from the axle driving gear, thrust brace members connected to the axle so as to form with the latter a substantially triangular thrust brace supporting the axle against the chassis in a substantially longitudinal direction of the vehicle, means providing for articulated connection of the thrust brace to the chassis and allowing for mobility between said thrust and the chassis at least about a transverse and a longitudinal axis of said vehicle, two links connected in series for supporting the axle relatively to the chassis transversely thereto and to the driving direction, articulating means providing for articulated connection of one of said two links to the chassis, additional articulating means providing for articulated connection of the other link to the axle, further articulating means providing for articulated connection of the two links to each other so as to cause the chassis together with the thrust brace and the two mentioned links to present a link quadrilateral in side elevation, the last one of the three last named articulating means allowing for mobility between the parts connected by all three means at least about a longitudinal and a transverse axis of the vehicle while the two other articulating means substantially allow for mobility only about a transverse axis of the vehicle so that the axle besides executing an up-and-down movement may also execute a swinging movement in relation to the chassis about a longitudinal axis which is determined by the articulated connection of the thrust brace to the chassis on the one hand and by the last named articulating means allowing for mobility about a longitudinal and transverse axis, and resilient means for cushioning the up-and-down movement of the axle in relation to the chassis.

13. Axle suspension for vehicles comprising a vehicle frame, a pair of wheels, an axle connecting the wheels, two thrust braces which are rigidly connected each to the axle and to one another so as to form together with the axle a substantially triangular and rigid bracing unit substantially solely supporting the axle against the frame in the longitudinal direction of the vehicle, the thrust braces being extended beyond the axle, substantially vertically arranged springs bearing on the one hand against the frame and on the other hand against the extensions of the thrust bearing, and the axle penetrating the thrust braces connected thereto, and means disposed between the axle and the frame of the vehicle which permits the axle to execute in relation to the frame of the vehicle not only an upward and downward movement, but at the same time also a swinging movement about a longitudinal axis of the vehicle, and having an axle housing suspended from the frame independently of the axle, while the springs are unguided helical springs arranged substantially vertically between the extended thrust braces and the frame of the vehicle.

14. Axle suspension for vehicles comprising a vehicle frame, a pair of wheels, an axle connecting the wheels, two thrust braces which are rigidly connected each to the axle and to one another so as to form together with the axle a substantially triangular and rigid bracing unit substantially solely supporting the axle against the frame in the longitudinal direction of the vehicle, the thrust braces being extended beyond the axle, substantially vertically arranged springs bearing on the one hand against the frame and on the other hand against the extensions of the thrust braces, and the axle penetrating the thrust braces connected thereto, wherein the thrust braces have a closed hollow cross section.

15. Axle suspension as in claim 14 in which the axle is tubular and passes through said thrust braces and is rigidly welded to the latter.

MAX WAGNER.
WALTER LAUKHUFF.